United States Patent
Coker et al.

(10) Patent No.: US 7,471,486 B1
(45) Date of Patent: Dec. 30, 2008

(54) DISK DRIVE ESTIMATING SEEK TIME ACCORDING TO A SEEK PROFILE AND A VARIANCE GROUP

(75) Inventors: Kenny T. Coker, Corona, CA (US); Alan T. Meyer, Anaheim Hills, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/961,521

(22) Filed: Dec. 20, 2007

(51) Int. Cl.
*G11B 5/596* (2006.01)
(52) U.S. Cl. .................. 360/78.06; 360/78.08; 711/112
(58) Field of Classification Search ........................ None
See application file for complete search history.

(56) References Cited

U.S. PATENT DOCUMENTS

| | | | |
|---|---|---|---|
| 4,899,234 A | 2/1990 | Genheimer | |
| 5,383,068 A | 1/1995 | Shimizu et al. | |
| 6,101,065 A | 8/2000 | Alfred et al. | |
| 6,111,720 A | 8/2000 | Clare et al. | |
| 6,191,912 B1 | 2/2001 | Gaertner et al. | |
| 6,195,222 B1 | 2/2001 | Heminger et al. | |
| 6,445,531 B1 | 9/2002 | Gaertner et al. | |
| 6,515,819 B1 | 2/2003 | Schmidt et al. | |
| 6,597,528 B1 | 7/2003 | Pang et al. | |
| 6,604,178 B1 | 8/2003 | Hall | |
| 6,657,811 B1 | 12/2003 | Codilian | |
| 6,754,036 B2 | 6/2004 | Dehnert | |
| 6,809,896 B2 | 10/2004 | Espeseth et al. | |
| 6,898,665 B1* | 5/2005 | Megiddo | 711/113 |
| 6,937,431 B2 | 8/2005 | Galloway | |
| 6,968,422 B1 | 11/2005 | Codilian et al. | |
| 7,061,714 B1* | 6/2006 | Yu | 360/78.07 |
| 7,088,538 B1 | 8/2006 | Codilian et al. | |
| 7,089,355 B2 | 8/2006 | Auerbach et al. | |
| 7,199,966 B1 | 4/2007 | Tu et al. | |
| 2003/0182499 A1* | 9/2003 | Espeseth et al. | 711/112 |

* cited by examiner

*Primary Examiner*—Jason C Olson
(74) *Attorney, Agent, or Firm*—Howard H. Sheerin, Esq.

(57) ABSTRACT

A disk drive is disclosed which receives a plurality of access commands from a host, where each access command identifies a target track. The access commands are stored in a command queue, and for each command in the command queue, a seek length is computed corresponding to a number of tracks between a current track the head is over and the target track of the access command. A seek time is computed in response to the seek length using a seek profile comprising a first plurality of seek length segments and a variance group comprising a second plurality of seek length segments. Each seek length segment corresponds to a range of seek lengths, and the first plurality of seek length segments is different than the second plurality of seek length segments.

24 Claims, 7 Drawing Sheets

| SEEK LENGTH | VARIANCE GROUP | SUM OF Δ SEEK TIME | COUNT |
|---|---|---|---|
| D1 - D2 | ADJ1 | SUM1 | CNT1 |
| D2 – D3 | ADJ2 | SUM2 | CNT2 |
| D3 – D4 | ADJ3 | SUM3 | CNT3 |
| . | . | . | . |
| . | . | . | . |
| . | . | . | . |
| DN - DM | ADJN | SUMN | CNTN |

FIG. 5A

| SEEK LENGTH | VARIANCE GROUP | SUM OF Δ SEEK TIME | COUNT | MARGIN |
|---|---|---|---|---|
| D1 - D2 | ADJ1 | SUM1 | CNT1 | M1 |
| D2 – D3 | ADJ2 | SUM2 | CNT2 | M2 |
| D3 – D4 | ADJ3 | SUM3 | CNT3 | M3 |
| . | . | . | . | . |
| . | . | . | . | . |
| . | . | . | . | . |
| DN - DM | ADJN | SUMN | CNTN | MN |

FIG. 5B

DISK DRIVE ESTIMATING SEEK TIME ACCORDING TO A SEEK PROFILE AND A VARIANCE GROUP

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1A, which shows a prior art disk format 2 comprising a number of data tracks 4, wherein the data tracks are banded together in this example to form three physical zones from the inner diameter of the disk (ZONE 1) to the outer diameter of the disk (ZONE 3).

The prior art disk format of FIG. 1 also comprises a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

Multiple access commands may be received from the host while the disk drive is executing a current access command. The access commands are typically buffered in a command queue, and when the disk drive is finished executing the current command, a next command is selected from the command queue according to a rotational position optimization (RPO) algorithm. The RPO algorithm attempts to select the next command that will minimize the mechanical latency in accessing the disk, including the seek time required to move the head to the target track and the rotational time for the head to reach the target data sector.

The seek time is typically estimated for a given seek length (the number of tracks the head must traverse to arrive at the target track), where the seek time is typically related to the performance capabilities of the VCM as well as the parameters selected for the servo system to perform the seek, such as the selected velocity trajectory. Since the performance capability of the VCM is typically not a linear function of seek distance, and since the servo parameters may change based on the seek distance, the relationship between the seek length and seek time is also typically not linear across the radius of the disk. This is illustrated in FIG. 1B which shows a seek profile giving the seek time as a function of seek length. In this example, the seek profile is divided into a number of seek length segments, where each seek length segment may correspond to adjusting a servo system parameter, such as adjusting the velocity trajectory. Each seek length segment may correspond to a single seek time estimate, or each seek length segment may correspond to a function (e.g., a linear function) which may provide a more accurate estimate of the seek time relative to the seek length.

Estimating the seek time based on a segmented seek profile as shown in FIG. 1B may not be particularly accurate due to the variance of the seek time across the disk radius independent of each seek length segment. To compensate for the variance, a margin is typically associated with each seek length segment to ensure that the estimated seek time does not underestimate the actual seek time which can significantly degrade performance due to slipped revolutions. However, for certain seek lengths the margin is too conservative which can also degrade performance by preventing the most optimal command from being selected.

There is, therefore, a need to improve the seek time estimates for an RPO algorithm employed in a disk drive.

BRIEF DESCRIPTION OF THE DRAWINGS

FIG. 5A illustrates an embodiment of the present invention wherein the variance group adjustment may be adapted after the control circuitry processes a number of access commands.

FIG. 5B illustrates an embodiment of the present invention wherein a margin is employed together with the variance group adjustment for each seek length segment.

DETAILED DESCRIPTION OF EMBODIMENTS OF THE INVENTION

Figure 1A:
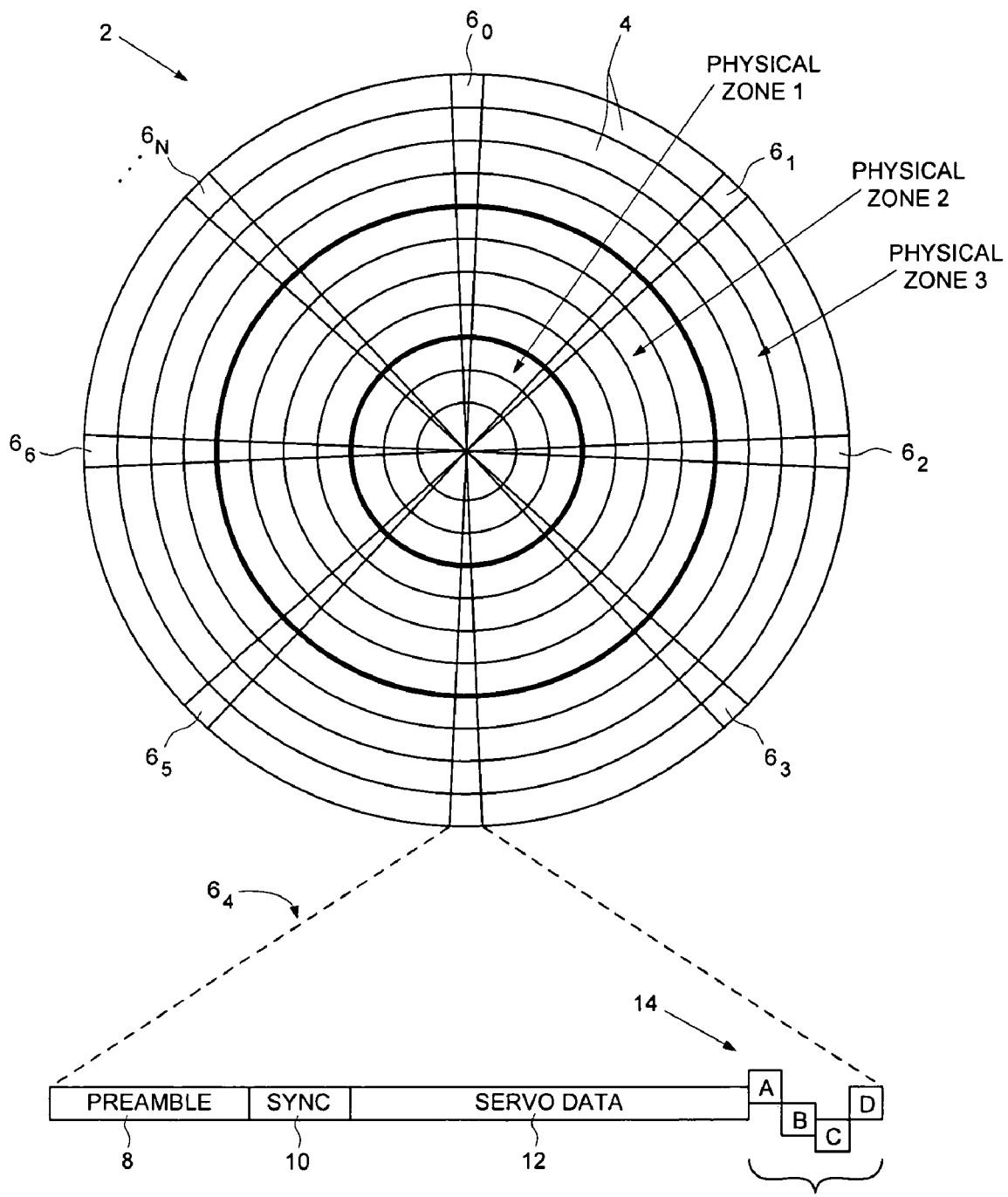
FIG. 1A shows a prior art disk format comprising a plurality of data tracks defined by embedded servo sectors.
Figure 1B:
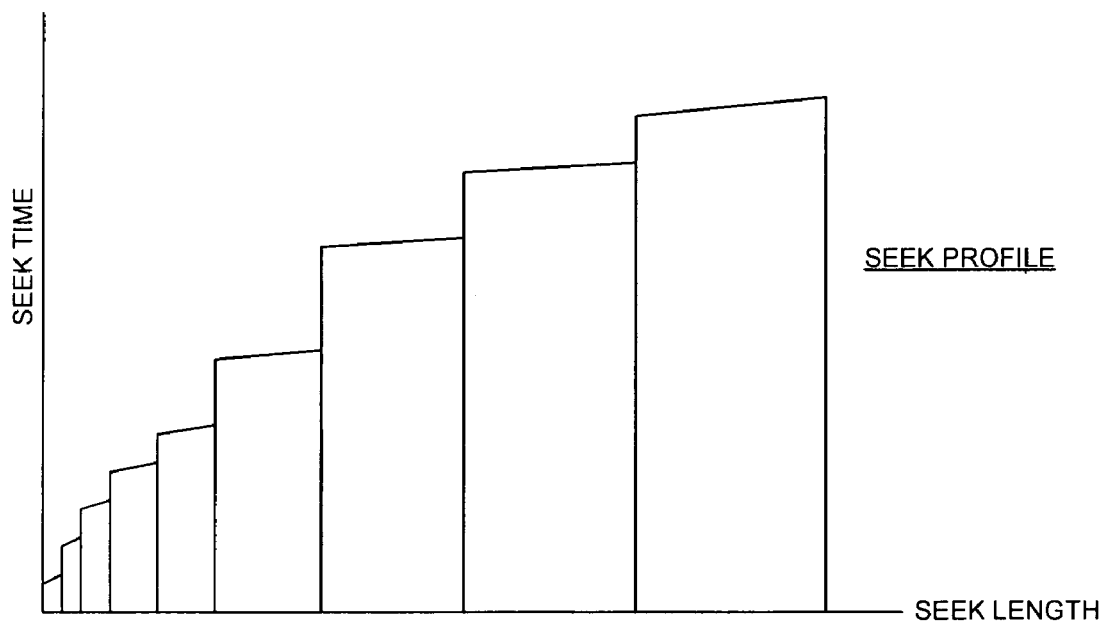
FIG. 1B shows a prior art seek profile giving the seek time as a function of seek length.
Figure 2B:
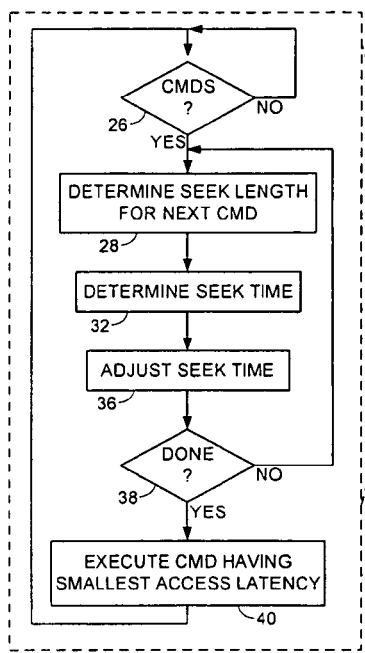
FIG. 2B shows a flow diagram executed by the control circuitry for implementing a RPO algorithm using a seek profile and a variance group for adjusting the estimated seek times at a different resolution than the seek profile.
Figure 2A:
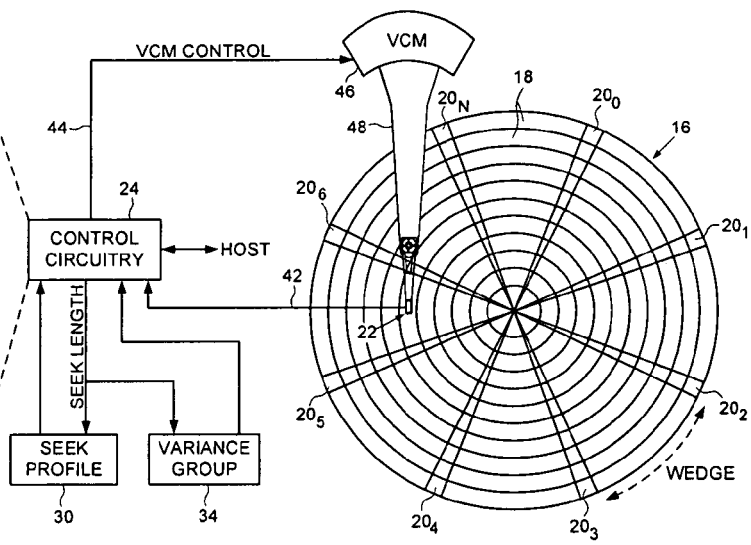
FIG. 2A shows a disk drive according to an embodiment of the present invention comprising a disk, a head actuated over the disk, and control circuitry.
Figures 3A, 3B:
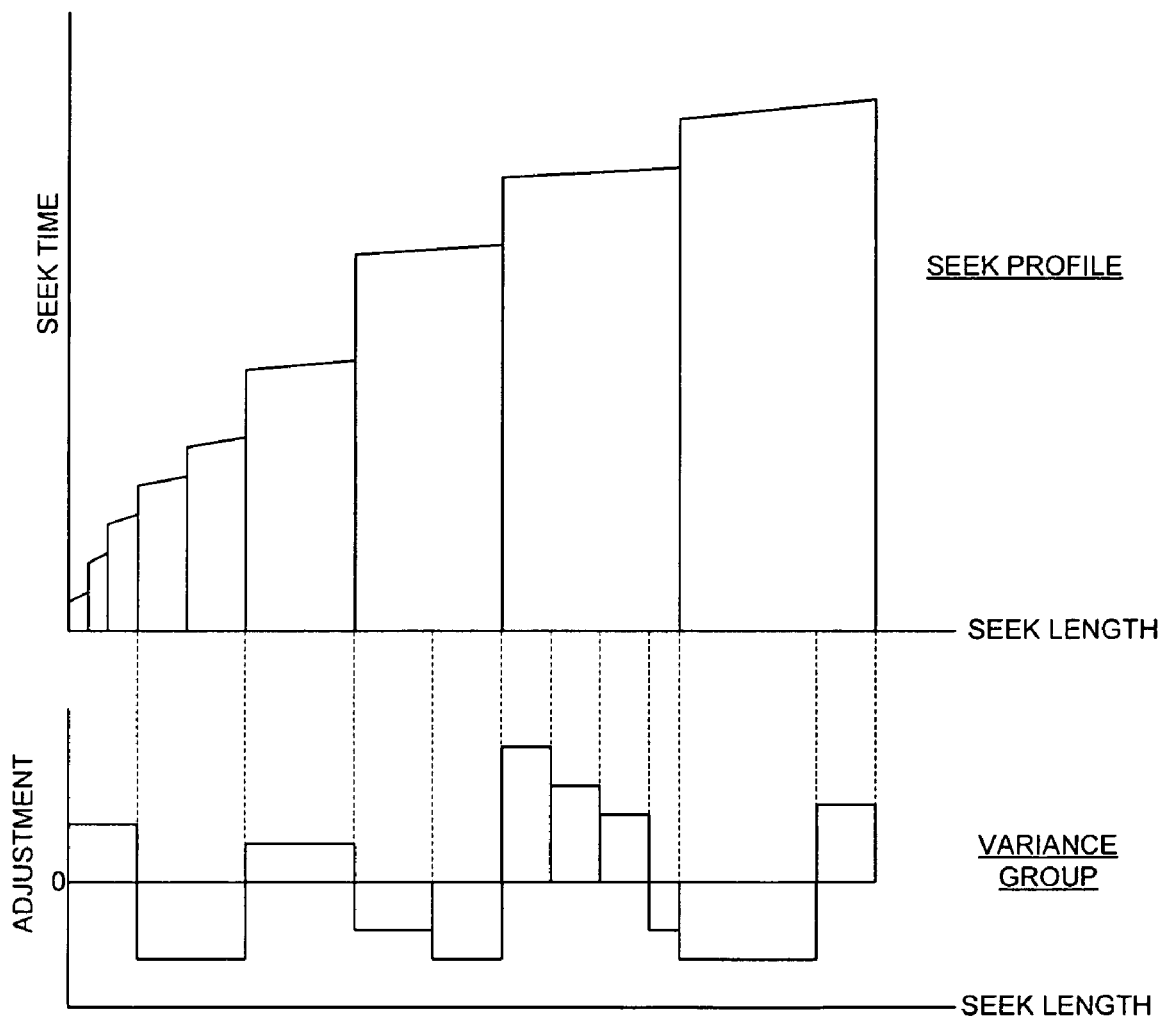
FIGS. 3A-3B illustrate the seek profile and variance group for adjusting the estimated seek times.

FIG. 2A shows a disk drive according to an embodiment of the present invention comprising a disk 16 including a plurality of tracks 18, wherein each track comprises a plurality of data sectors and a plurality of servo sectors $20_0$-$20_N$. The disk drive further comprises a head 22 actuated over the disk 16 and control circuitry 24 operable to execute the flow diagram of FIG. 2B. A plurality of access commands are received from a host (step 26), where each access command identifies a target track. The access commands are stored in a command queue, and a seek length is determined corresponding to a number of tracks between a current track the head is over and the target track of each access command (step 28). A seek time in response to the seek length is determined using a seek profile 30 comprising a first plurality of seek length segments (step 32) and a variance group 34 comprising a second plurality of seek length segments (step 36). Each seek length segment corresponds to a range of seek lengths, and the first plurality of seek length segments is different than the second plurality of seek length segments (FIGS. 3A and 3B). The control circuitry 24 then executes the access command in the command queue having the smallest access latency (step 40).

In the embodiment of FIG. 2A, the control circuitry 24 processes the read signal 42 emanating from the head 22 to demodulate the embedded servo sectors $20_0$-$20_N$ and generate a position error signal (PES) representing a radial offset of the head 22 from a target track 18. The control circuitry 24 processes the PES with a suitable servo compensator to generate a control signal 44 applied to a voice coil motor (VCM) 46. The VCM 46 rotates an actuator arm 48 about a pivot in order to actuate the head 22 radially over the disk 16 in a direction that decreases the PES.

FIG. 3A shows an example seek profile according to an embodiment of the present invention. The x-axis shows a plurality of seek length segments and the y-axis shows the corresponding seek time for each seek length segment. The estimated seek time for each seek length segment may be determined in any suitable manner, such as by computing an average seek time out of a number of measured seek times after processing a number of access commands. In one embodiment, the difference between two of the seek length segments in the seek profile corresponds to a difference in a servo system parameter, such as a difference in a velocity trajectory. Each seek length segment may correspond to a single seek time estimate, or each seek length segment may correspond to a function (e.g., a linear function) which may provide a more accurate estimate of the seek time relative to the seek length.

FIG. 3B shows an example variance group according to an embodiment of the present invention. The x-axis shows a plurality of seek length segments and the y-axis shows the corresponding adjustment to the seek time for each seek length segment similar to FIG. 3A. However, the resolution of the seek length segments in the variance group may be different than the resolution of the seek profile for at least part of the seek lengths. For example, in one embodiment at least one of the seek length segments of the seek profile spans more than one of seek length segments of the variance group, such as the seventh seek length segment of the seek profile shown in FIG. 3B. In another embodiment, at least one of the seek length segments of the variance group spans more than one of seek length segments of the seek profile, such as the second seek length segment of the variance group shown in FIG. 3B. Adjusting the resolution of the variance group seek length segments provides more flexibility in estimating the seek time as compared to using a seek profile alone.

Any suitable resolution of seek length segments in the variance group may be employed in the embodiments of the present invention. In one embodiment, each seek length segment in the variance group comprises a similar variance in an estimated seek time from a nominal seek time (e.g., as determined from the seek profile). The variance along the entire x-axis of seek length segments may be evaluated for a number of disk drives to determine the size and number of seek length segments in the variance group. In addition, a number of disk drives may be evaluated to determine an initial seek time adjustment value corresponding to each seek length segment as shown in FIG. 3B. The estimated seek time determined using the seek profile of FIG. 3A is then adjusted using the corresponding variance group adjustment value which may be a positive or negative value as shown in FIG. 3B. In an embodiment described in more detail below, the variance group adjustment values may be adapted after executing a plurality of access commands and comparing the estimated seek time to the actual seek time.

Figure 4:
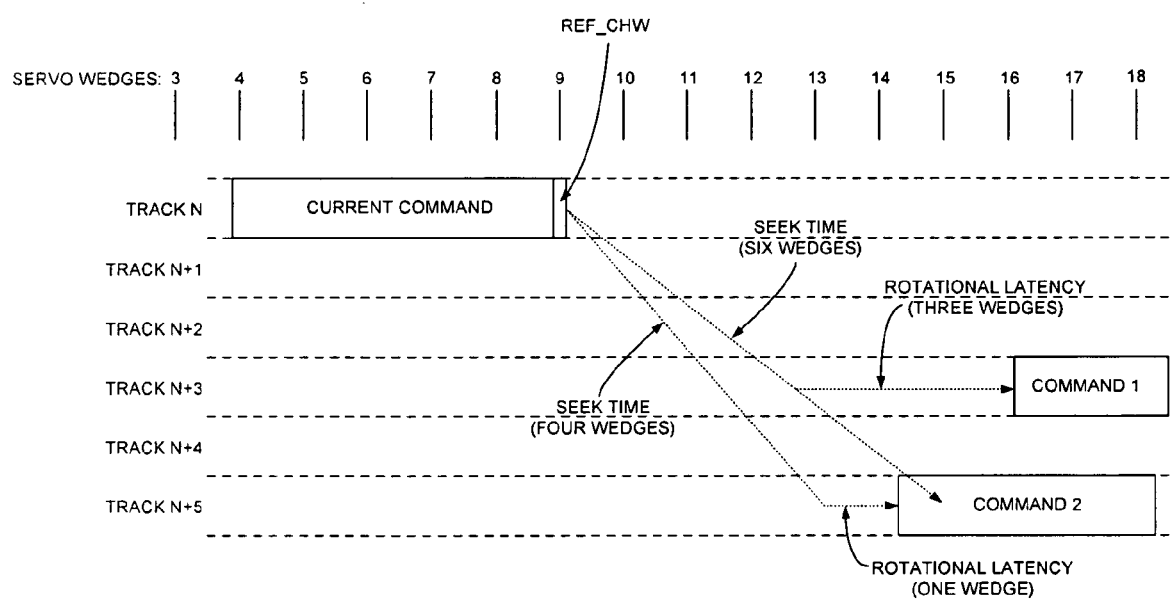
FIG. 4 illustrates how the RPO algorithm may select a first or second command depending on whether the estimated seek time is adjusted using the variance group.

FIG. 4 illustrates how the RPO algorithm may select a first or second command depending on whether the estimated seek time is adjusted using the variance group. When the head 22 is positioned over track N in order to process a current command, an estimated seek time is determined for the pending access commands in the command queue (two in this example). The latency in accessing the next access command may be determined from the end of the current command (REF_CHW) relative to a time period required to position the head 22 over the next access command. For example, the embodiment shown in FIG. 4 uses a number of wedges for the time period, where a wedge equals the rotational latency between servo sectors. In the example of FIG. 4, if the estimated seek time for the second command is not adjusted using the variance group of FIG. 3B, then the estimated seek time may equal six wedges which means the head 22 will not reach the target track (track N+5) in front of the second command. Therefore, the RPO algorithm will select the first command (in track N+3) to execute to avoid slipping a revolution. However, if the estimated seek time is adjusted using the variance group of FIG. 3B for the second command, the estimated seek time determined from the seek profile of FIG. 3A is adjusted to four wedges as illustrated in FIG. 4. Therefore, the RPO algorithm will select the second command to execute since the head 22 will arrive at the target track (track N+5) in front of the second command, and the total latency in accessing the second command (five wedges) is less than the total latency in accessing the first command (seven wedges).

In an embodiment illustrated in FIG. 5A, the adjustment values in the variance group that correspond to each seek length segment are adapted during the operation of the disk drive. After the control circuitry 24 executes an access command, the estimated seek time is subtracted from the actual seek time to generate a delta seek time. The delta seek times for each seek length segment are summed, and when a counter exceeds a predetermined threshold, the summed delta value is divided by the threshold count and the result used to adapt the adjustment value for the seek length segment. In this manner, the adjustment value of a seek length segment is adapted to account for changes in operating parameters, such as a change in the ambient temperature. Other methods of adjusting the adjustment values may be used.

In another embodiment illustrated in FIG. 5B, a margin is generated for each seek length segment of the variance group, wherein the margin is also used to adjust the estimated seek time. The margin helps ensure the estimated seek time will not be over-adjusted by the variance group adjustment value and thereby increase the number of slipped revolutions due to the head 22 arriving at the target track too late. The margin may be determined using any suitable technique, such as a suitable standard deviation (sigma) for a number of measured seek times corresponding to a particular seek length segment.

Figure 6:
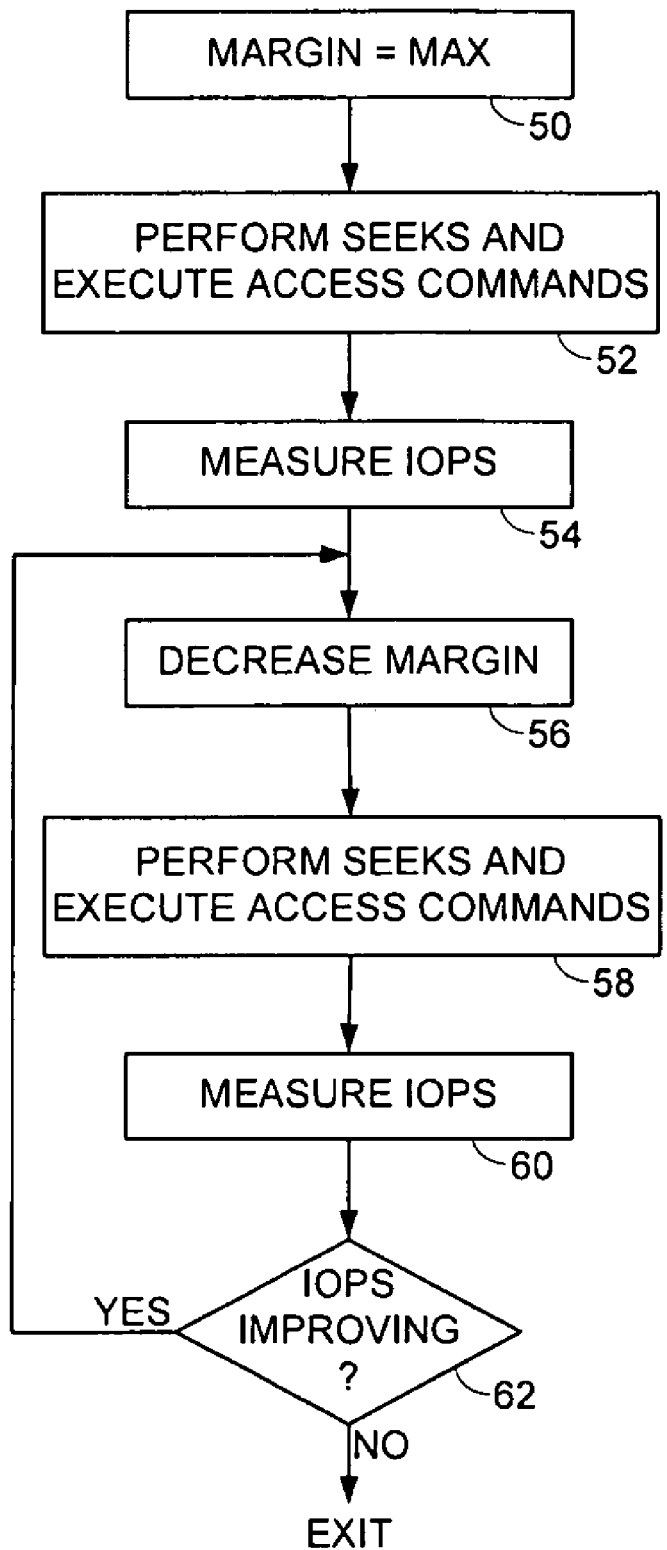
FIG. 6 is a flow diagram according to an embodiment of the present invention wherein the margin is determined for each seek length segment of the variance group by measuring a throughput of the disk drive after executing a plurality of the access commands.

FIG. 6 shows a flow diagram according to another embodiment of the present invention wherein the margin shown in FIG. 5B is determined for each seek length segment by measuring a throughput of the disk drive after executing a plurality of access commands. The margin is initialized to a maximum value (step 50), and then a number of access commands are executed (step 52) using the maximum margin. The throughput of the disk drive (e.g., instructions per second (IOPS)) is measured (step 54) and the margin is decreased (step 56). A number of access commands are again executed (step 58) using the adjusted margin, and the throughput of the disk drive measured (step 60). If the throughput is improving (step 62), then the margin is decreased further (step 56), the access commands re-executed (step 58), and the throughput measured (step 60). This process repeats until the throughput stops improving (step 62) wherein the table of FIG. 5B is initialized with the corresponding margin. In one embodiment, adjusting the margin may improve the throughput due to a corresponding improvement in the RPO algorithm. In another embodiment, adjusting the margin may also improve the throughput due to a corresponding improvement in a predictive caching algorithm which adjusts the number of preread and/or postread data sectors based on the estimated seek time.

The flow diagram of FIG. 6 may be executed in any suitable configuration. In one embodiment, a host connected to the disk drive executes the flow diagram of FIG. 6 to measure the throughput and adjust the margin. For example, in one embodiment a host executes a standard benchmark test intended to measure the throughput of the disk drive for various seek lengths. In this embodiment, the margin is adjusted until the disk drive (or a number of disk drives) provide the best benchmark results.

In another embodiment, the control circuitry 24 within the disk drive executes the flow diagram of FIG. 6 to adjust the margin until the throughput reaches a maximum. In one embodiment, a number of test disk drives execute the flow diagram of FIG. 6 and a nominal margin (e.g., an average margin) is selected for programming into each production disk drive. In an alternative embodiment, each production disk drive executes the flow diagram of FIG. 6 in order to optimize the margin individually for each production disk drive.

Determining the margin relative to the throughput of the disk drive may be used in any suitable manner to adjust the estimated seek time. In the embodiment shown in FIG. 5B, a margin is determined for each seek length segment of the variance group. In an alternative embodiment, the margin may be determined for each seek length segment in the seek profile of FIG. 3A independent as to whether the variance group of FIG. 3B is used to adjust the estimated seek time.

Any suitable control circuitry 24 may be employed in the embodiments of the present invention, such as any suitable integrated circuit or circuits. For example, the control circuitry 24 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 24 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 16 and read into a volatile semiconductor memory when the disk drive is powered on. In yet another embodiment, the control circuitry 24 comprises suitable logic circuitry, such as state machine circuitry.

What is claimed is:

1. A disk drive comprising:
  a disk comprising a plurality of tracks, wherein each track comprises a plurality of data sectors and a plurality of servo sectors;
  a head actuated radially over the disk; and
  control circuitry operable to:
    receive a plurality of access commands from a host, where each access command identifies a target track;
    store the access commands in a command queue; and
    for each access command in the command queue:
      determine a seek length corresponding to a number of tracks between a current track the head is over and the target track of the access command;
      determine a seek time in response to the seek length using a seek profile comprising a first plurality of seek length segments and a variance group comprising a second plurality of seek length segments, wherein:
        each seek length segment corresponds to a range of seek lengths; and
        the first plurality of seek length segments is different than the second plurality of seek length segments.

2. The disk drive as recited in claim 1, wherein the control circuitry is further operable to execute the access command in the command queue having the smallest access latency.

3. The disk drive as recited in claim 1, wherein at least one of the first plurality of seek length segments spans more than one of the second plurality of seek length segments.

4. The disk drive as recited in claim 1, wherein at least one of the second plurality of seek length segments spans more than one of the first plurality of seek length segments.

5. The disk drive as recited in claim 1, wherein a difference between two of the first plurality of seek length segments corresponds to a difference in a servo system parameter.

6. The disk drive as recited in claim 1, wherein the control circuitry is further operable to adapt the second plurality of seek length segments in response to executing at least two of the access commands.

7. The disk drive as recited in claim 1, wherein the variance group further comprises a margin associated with each of the second plurality of seek length segments.

8. The disk drive as recited in claim 7, wherein the control circuitry is further operable to determine the margin for each seek length segment by measuring a throughput of the disk drive after executing a plurality of the access commands.

9. A disk drive comprising:
  a disk comprising a plurality of tracks, wherein each track comprises a plurality of data sectors and a plurality of servo sectors;
  a head actuated radially over the disk; and
  control circuitry operable to:
    receive a plurality of access commands from a host, where each access command identifies a target track;
    store the access commands in a command queue; and
    for each access command in the command queue:
      determine a seek length corresponding to a number of tracks between a current track the head is over and the target track of the access command;
      determine a seek time in response to the seek length using a seek profile comprising a plurality of seek length segments, wherein:
        each seek length segment corresponds to a range of seek lengths; and a margin is determined for each seek length segment by measuring a throughput of the disk drive after executing a plurality of the access commands.

10. The disk drive as recited in claim 9, wherein a host connected to the disk drive determines the margin for each seek length segment by measuring the throughput of the disk drive after executing the plurality of the access commands.

11. The disk drive as recited in claim 9, wherein the control circuitry is operable to determine the margin for each seek length segment by measuring the throughput of the disk drive after executing the plurality of the access commands.

12. The disk drive as recited in claim 9, wherein the throughput of the disk drive is measured relative to a number of access commands executed per second.

13. The disk drive as recited in claim 9, wherein the margin is determined by finding a margin that maximizes the throughput of the disk drive for each seek length segment.

14. A method of operating a disk drive, the disk drive comprising a disk comprising a plurality of tracks, wherein each track comprises a plurality of data sectors and a plurality of servo sectors, and a head actuated radially over the disk, the method comprising:
receiving a plurality of access commands from a host, where each access command identifies a target track;
storing the access commands in a command queue; and
for each access command in the command queue:
determining a seek length corresponding to a number of tracks between a current track the head is over and the target track of the access command;
determining a seek time in response to the seek length using a seek profile comprising a first plurality of seek length segments and a variance group comprising a second plurality of seek length segments, wherein:
each seek length segment corresponds to a range of seek lengths; and
the first plurality of seek length segments is different than the second plurality of seek length segments.

15. The method as recited in claim 14, further comprising executing the access command in the command queue having the smallest access latency.

16. The method as recited in claim 14, wherein at least one of the first plurality of seek length segments spans more than one of the second plurality of seek length segments.

17. The method as recited in claim 14, wherein at least one of the second plurality of seek length segments spans more than one of the first plurality of seek length segments.

18. The method as recited in claim 14, wherein a difference between two of the first plurality of seek length segments corresponds to a difference in a servo system parameter.

19. The method as recited in claim 14, further comprising adapting the second plurality of seek length segments in response to executing at least two of the access commands.

20. The method as recited in claim 14, wherein the variance group further comprises a margin associated with each of the second plurality of seek length segments.

21. The method as recited in claim 20, further comprising determining the margin for each seek length segment by measuring a throughput of the disk drive after executing a plurality of the access commands.

22. A method of operating a disk drive, the disk drive comprising a disk comprising a plurality of tracks, wherein each track comprises a plurality of data sectors and a plurality of servo sectors, and a head actuated radially over the disk, the method comprising:
receiving a plurality of access commands from a host, where each access command identifies a target track;
storing the access commands in a command queue; and
for each access command in the command queue:
determining a seek length corresponding to a number of tracks between a current track the head is over and the target track of the access command;
determining a seek time in response to the seek length using a seek profile comprising a plurality of seek length segments, wherein:
each seek length segment corresponds to a range of seek lengths; and
a margin is determined for each seek length segment by measuring a throughput of the disk drive after executing a plurality of the access commands.

23. The method as recited in claim 22, wherein the throughput of the disk drive is measured relative to a number of access commands executed per second.

24. The method as recited in claim 22, wherein the margin is determined by finding a margin that maximizes the throughput of the disk drive for each seek length segment.

* * * * *